Aug. 6, 1963  J. P. RICH  3,100,192
GROUNDWOOD DISCHARGER
Filed Nov. 10, 1958  2 Sheets-Sheet 1
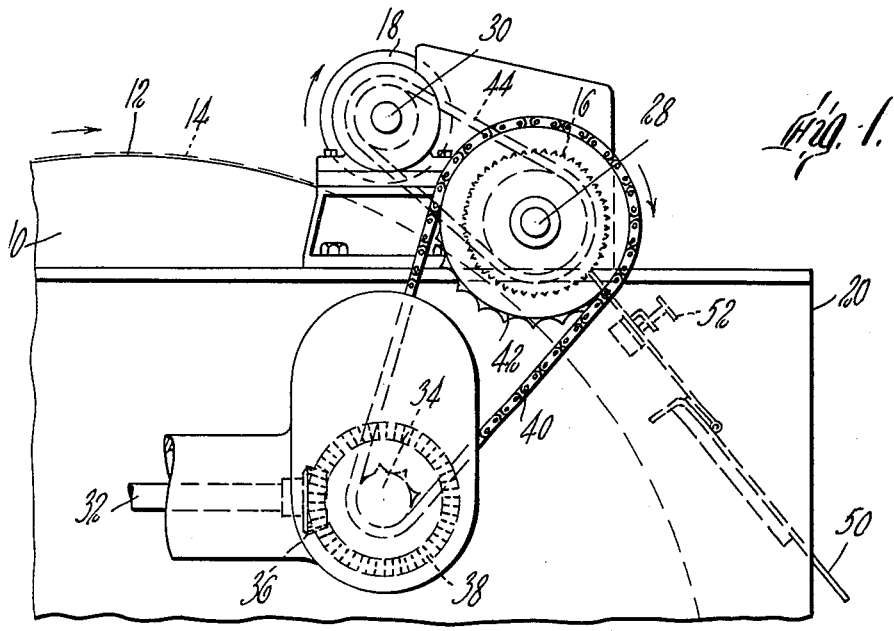
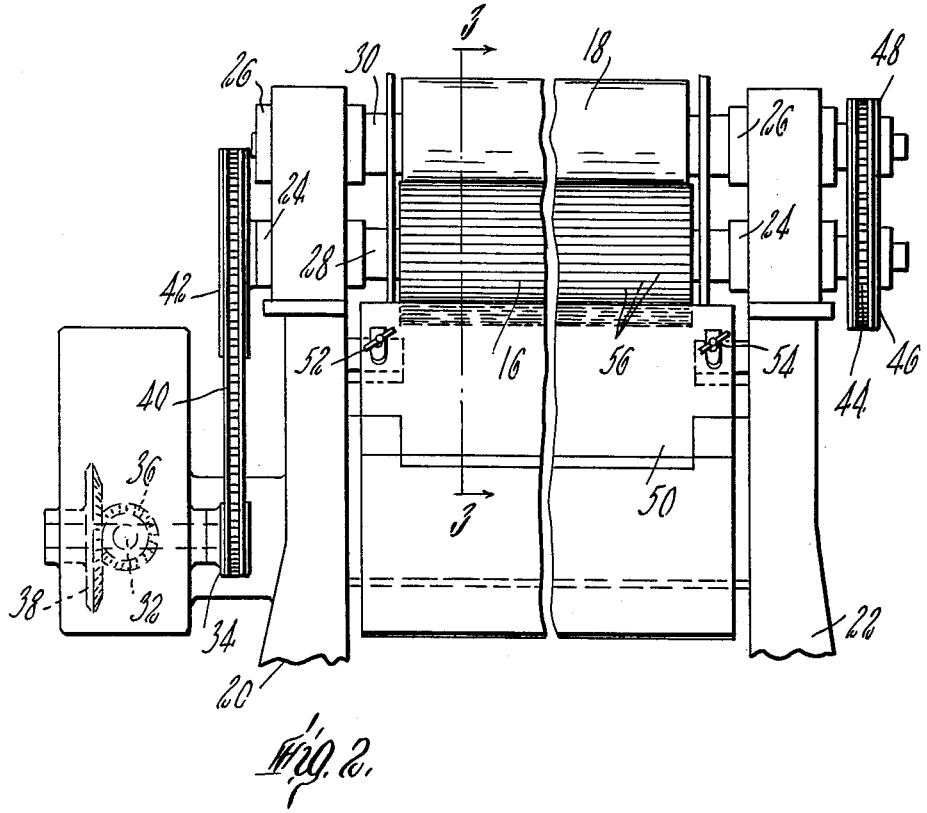

Aug. 6, 1963         J. P. RICH         3,100,192
              GROUNDWOOD DISCHARGER
Filed Nov. 10, 1958                 2 Sheets-Sheet 2

3,100,192
GROUNDWOOD DISCHARGER
John P. Rich, Nashua, N.H., assignor to Improved Machinery Inc., Nashua, N.H., a corporation of Maine
Filed Nov. 10, 1958, Ser. No. 772,966
1 Claim. (Cl. 210—386)

This invention relates to continuous rotary filters, and more particularly to a rotary filter structure particularly suitable for the discharging of groundwood pulp.

Typically, during the treatment of groundwood pulp a filtering process is used. The type of filter utilized is, conventionally, a rotary drum filter. Such a filter typically comprises a large cylindrical drum mounted horizontally for rotation on its axis and suspended above a tank such that a lower portion of the drum is submerged in the material to be filtered. Application of an inwardly directed pressure differential to the foraminous surface of the drum causes material to adhere thereto in the form of filter cake with the suspending liquid being drawn through the surface into the interior of the drum.

Various means have been utilized for removing or discharging the filter cake from the drum, groundwood pulp in particular presenting a different removal problem. Because of its wet, low strength, short fibered structure it tends to stick to the drum as well as to the discharge elements employed. This problem arises especially in dischargers utilizing a single axially extending discharge roll, since the pulp tends to roll up like a snowball in a large cylinder of groundwood pulp which periodically passes over the discharge roll into the water which is to suspend it for movement to the next succeeding process step. The most efficient removal occurs when there is a snowball of cake present and this periodic discharge of the entire ball therefore lowers the efficiency of the discharge operation. Also, the large roll of pulp has a tendency not to return to supension in the water, and so nonuniform suspensions detrimental to succeeding process stages tend to occur. Axial dischargers are not an effective solution to the problem because the filter cake is thereby compressed in its axial movement and is discharged in compressed discrete lumps which do not readily return to suspension as required.

Accordingly, it is an object of the invention to provide an improved rotary drum filter discharge apparatus, particularly suitable for use with groundwood pulp filtering systems.

Another object of the invention is to provide an improved rotary drum filter discharge in which the filter cake is discharged radially from the drum in condition suitable for entering into suspension.

The discharger according to the invention includes a discharge roll mounted for rotation parallel to the filter drum and immediately adjacent to the descending surface thereof. The discharge roll is adapted to rotate in the same direction as the drum and closely adjacent to the surface thereof. This roll acts to remove the filter cake and causes it to accumulate in snowball fashion between it and the drum surface. Preferably the discharge roll is driven at a surface speed slightly greater than that of the drum. A second roll is mounted parallel to and above the rear of the discharge roll. In the preferred embodiment this roll has a smooth surface and is driven at approximately the same speed as the discharge roll and in the same direction. This second roll assists in the formation of the filter cake roll while acting to prevent the occasional discharge of that entire roll. In operation, a portion of the cake roll is periodically extruded between the two rolls and transferred to the suspending medium. This discharger assists in the formation of the cake roll, and assures the maintenance of such a cake roll while discharging a portion thereof in a manner such that it readily enters into suspension in water.

Other objects and features of the invention will become apparent as the following description of the preferred embodiment of the invention progresses, in conjunction with the drawings, in which:

FIG. 1 is an end view of a portion of the rotary drum filter mechanism with the novel discharge apparatus mounted adjacent thereto;

FIG. 2 is a side view of the drum filter mechanism and discharge apparatus; and

Figure 3:
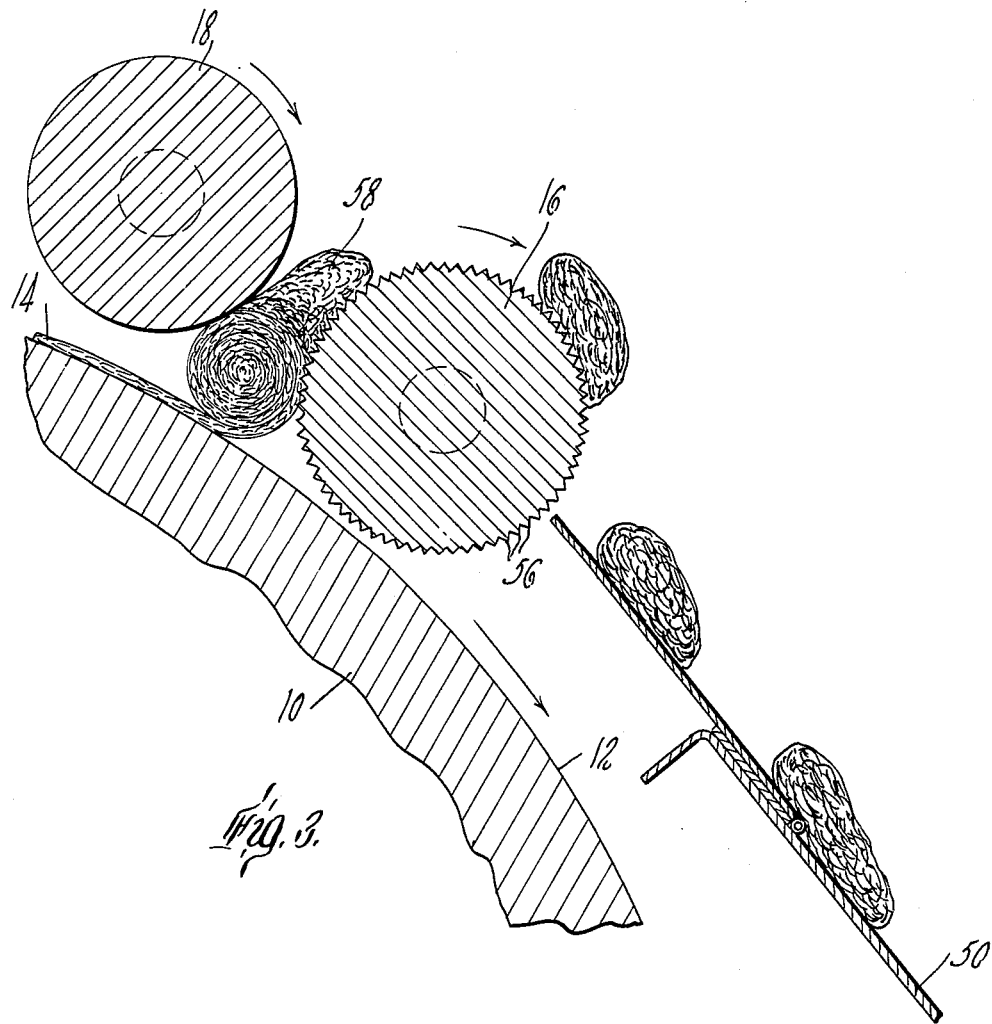
FIG. 3 is a sectional view taken along the line 3—3 of FIG. 2 showing, in certain detail, the operation of the discharge apparatus in removing a filter cake of groundwood pulp from the filter drum.

As shown in FIGS. 1 and 2, the discharge apparatus according to the invention is associated with a conventional rotary drum filter. The drum 10 has a foraminous cylindrical surface 12 to which an inwardly directed pressure differential is applied. The drum is supported by a shaft in a conventional manner such that a lower portion is suspended in a tank (not shown) which contains the slurry to be filtered. It is rotatably driven in clockwise direction as viewed in FIG. 1. The pressure differential applied to the drum surface causes the slurry to be attracted to that surface. Water or other similar material to be removed is extracted through the surface into the interior of the drum and the remaining particles of the slurry adhere in a layer to the drum surface as a filter cake 14.

Mounted adjacent the drum surface on the descending side of the drum are two rolls 16, 18. These rolls extend the length of the drum parallel to the axis thereof.

A pedestal support 20, 22 is positioned at either end of the drum. Mounted in each of the pedestal supports are two sets of bearings 24, 26. The shaft 28 of roll 16 is journalled in the bearings 24 and the shaft 30 of roll 18 is journalled in the bearings 26.

The rolls are driven by suitable chain drives and gearing. The shaft 32, driven by appropriate means (not shown), drives the sprocket 34 through pinion gears 36 and 38. A chain 40 cooperates with sprocket 34 to drive a sprocket 42 which is secured to the shaft of roll 16 in driving relationship. At the opposite end of shaft 28 there is provided a second chain 44 and associated sprockets 46 and 48. This chain drive permits the driven shaft of the roll 16 to drive the shaft of roll 18. In this manner the two rolls and the drum are driven in the same direction.

A stock slide 50 is provided adjacent the roll 16 to receive the discharged filter cake. Thumb screws 52 and 54 are provided to secure the stock slide in place adjacent the discharge roll. These may be loosened if desired in order to adjust the position of the slide or to obtain access to the filter drum surface.

The roll 16 is provided with a plurality of axially extending vanes or corrugations 56 while the roll 18 has a smooth surface which has a low coefficient of friction relative to the filter cake. A running clearance is provided between the drum surface and the vaned discharge roll 16 whereas a substantially larger clearance is provided between the drum and the smooth roll 18.

Preferably the discharge roll is driven such that its peripheral speed of about ten percent greater than that of the drum. The smooth roll is driven at approximately the same peripheral speed as the discharge roll.

The operation of the discharge apparatus may be understood with reference to FIG. 3. In operation the layer of filter cake 14 accumulated on the surface 12 of the drum, is rolled up into a longitudinal roll 58, similar in manner to the rolling of a snowball, due to the cooperation of the discharge roll 16 with the drum surface 12. The vaned surface of the discharge roll assists the removal of the filter cake from the drum surface.

The smooth roll 18, mounted above and to the rear of the discharge roll 16, acts to aid in the formation of the roll 58 as the adjacent surface in that area is moving in the same direction as the surface of the cake roll. However, the coefficient of friction between the two surfaces is low and when the accumulated roll 58 of filter cake has achieved sufficient bulk a portion of that roll is forced or extruded outwardly between the two rolls 16, 18 and over the discharge roll onto the stock slide 50.

This extruded portion of the filter cake has a consistency such that it is easily returned into suspension. This mechanical working of the filter cake in the extrusion process provides an excellent transition between the filter drum and the water or other transport medium. The discharge takes place over the entire length of the filter drum in a radial manner and thus compression of filter cake, which often results in axial transport systems is avoided. In addition the invention provides a discharge apparatus which aids in the formation of the filter cake roll and assures its stability.

While a preferred embodiment of the invention has been shown and described herein it is not intended that the invention be limited thereto or to details thereof and departures may be made therefrom within the spirit and scope of the invention as defined in the following claim.

I claim:

Apparatus for discharging filter cake in the form of a layer of wet, cohesive solids, from the drum of a continuous rotary drum filter comprising, in combination with a rotary drum filter, a vaned discharge roll mounted immediately adjacent and parallel to the face of said filter drum on the descending side thereof, means for rotating said discharge roll in the same direction as the rotation of said drum, said discharge roll cooperating with the descending side of said drum to cause said layer of solids to accumulate in a roll between the descending side of said drum and the ascending side of said discharge roll, and means for removing discrete portions of the roll of solids and discharging the same in a direction perpendicular to the axis of rotation of said drum filter over said discharge roll, said means including a smooth surfaced cylinder mounted parallel to and adjacent the descending side of said drum above said discharge roll and extending the length of said drum, said smooth surfaced cylinder having a lower coefficient of friction relative to said solids than said discharge roll and means to drive said smooth surfaced cylinder in the same direction and at substantially the same peripheral speed as said discharge roll, said smooth surfaced cylinder maintaining an accumulation of solids in a roll between said discharge roll and said drum while causing discrete portions thereof to be extruded between said smooth surfaced cylinder and said discharge roll for transfer over said discharge roll to a suitable transport medium.

References Cited in the file of this patent
UNITED STATES PATENTS

| | | |
|---|---|---|
| 1,812,648 | Gardella | June 30, 1931 |
| 2,060,896 | Raisch | Nov. 17, 1936 |
| 2,294,179 | Hawley | Aug. 25, 1942 |
| 2,446,746 | Denhard et al. | Aug. 10, 1948 |
| 2,689,654 | Ohlstrom | Sept. 21, 1954 |